US010638503B2

(12) United States Patent
Lindoff et al.

(10) Patent No.: US 10,638,503 B2
(45) Date of Patent: Apr. 28, 2020

(54) SCHEDULING GRANT CONTROL

(71) Applicant: TELEFONAKTIEBOLAGET LM ERICSSON (PUBL), Stockholm (SE)

(72) Inventors: Bengt Lindoff, Bjarred (SE); Robert Baldemair, Solna (SE); Fredrik Lindqvist, Jarfalla (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/428,720

(22) PCT Filed: Dec. 18, 2014

(86) PCT No.: PCT/EP2014/078376
§ 371 (c)(1),
(2) Date: Mar. 17, 2015

(87) PCT Pub. No.: WO2016/096007
PCT Pub. Date: Jun. 23, 2016

(65) Prior Publication Data
US 2016/0345356 A1 Nov. 24, 2016

(51) Int. Cl.
*H04W 4/00* (2018.01)
*H04W 72/14* (2009.01)
*H04W 72/12* (2009.01)

(52) U.S. Cl.
CPC ....... *H04W 72/14* (2013.01); *H04W 72/1268* (2013.01)

(58) Field of Classification Search
CPC . H04W 88/02; H04W 72/0413; H04W 88/08; H04L 5/0048; H04L 5/0053
(Continued)

(56) References Cited

U.S. PATENT DOCUMENTS

2003/0037146 A1* 2/2003 O'Neill ............... H04W 76/046
709/226
2003/0223429 A1* 12/2003 Bi ......................... H04L 47/11
370/395.4
(Continued)

FOREIGN PATENT DOCUMENTS

| CN | 102123399 A | 7/2011 |
| WO | 2009115909 A1 | 9/2009 |
| WO | 2009134196 A1 | 11/2009 |

OTHER PUBLICATIONS

PCT International Search Report, dated Aug. 21, 2015, by the European Patent Office, in connection with International Application No. PCT/EP2014/078376, all pages.
(Continued)

*Primary Examiner* — Atique Ahmed
(74) *Attorney, Agent, or Firm* — Leffler Intellectual Property Law, PLLC

(57) ABSTRACT

A method is disclosed of a network node adapted to operate in association with first and second wireless communication devices associated with first and second latency requirements, respectively, wherein a latency of the second latency requirement is lower than a latency of the first latency requirement. The method comprises receiving a first scheduling request for uplink transmission by the first wireless communication device, and transmitting a first scheduling grant indicating an allocated first communication resource for the uplink transmission by the first wireless communication device. The method also comprises receiving (simultaneously with or after transmitting the first scheduling grant) a second scheduling request for uplink transmission by the second wireless communication device, determining whether the first communication resource and an allocated second communication resource for the uplink transmission by the second wireless communication device at least partly
(Continued)

overlap, and transmitting a second scheduling grant indicating the second communication resource. The method further comprises (if it is determined that the first and second communication resources at least partly overlap) transmitting (to the first wireless communication device) a scheduling grant annulment instruction for preventing the uplink transmission by the first wireless communication device using the first communication resource. Corresponding method of the first network node is also disclosed, along with corresponding computer program product, arrangements, network node and first wireless communication device.

19 Claims, 3 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2006/0133312 A1* | 6/2006 | Harrison Teague | H04W 72/042 370/329 |
| 2007/0121542 A1* | 5/2007 | Lohr | H04L 47/2425 370/329 |
| 2009/0109907 A1 | 4/2009 | Tsai et al. | |
| 2010/0150089 A1 | 6/2010 | Yu et al. | |
| 2010/0182973 A1 | 7/2010 | Kim et al. | |
| 2011/0292895 A1* | 12/2011 | Wager | H04L 5/0007 370/329 |
| 2012/0155354 A1* | 6/2012 | Kishigami | H04B 7/0452 370/311 |
| 2013/0003678 A1* | 1/2013 | Quan | H04W 72/04 370/329 |
| 2013/0051358 A1* | 2/2013 | Turtinen | H04W 74/0816 370/330 |
| 2013/0133041 A1 | 5/2013 | Magyar et al. | |
| 2013/0343355 A1 | 12/2013 | Barbieri et al. | |

OTHER PUBLICATIONS

PCT Written Opinion, dated Aug. 21, 2015, by the European Patent Office, in connection with International Application No. PCT/EP2014/078376, all pages.

Ericsson et al., 3GPP TSG-RAN WG2 #67; Latency improvement comparison, R2-094825, Shenzhen, China, Aug. 24-28, 2009, 6 pages.

Ericsson et al., TSG-RAN WG2 Meeting #61, Control of semi persistent scheduling, R2-080765, Sorrento, Italy, Feb. 11-15, 2008, 2 pages.

Email Rapporteur, 3GPP TSG-RAN WG2 #63, Summary of the email discussion on remaining issues on Semi Persistent Scheduling, R2-083900, Jeju, Korea, Aug. 18-22, 2008, 6 pages.

Chinese Office Action, dated Nov. 8, 2019, in connection with Chinese Application No. 201480084151.8, 9 pages.

English language translations of Chinese Office Action, dated Nov. 8, 2019, in connection with Chinese Application No. 201480084151.8, 9 pages.

* cited by examiner

SCHEDULING GRANT CONTROL

TECHNICAL FIELD

The present invention relates generally to the field of wireless communication. More particularly, it relates to control of scheduling grants in wireless communication systems.

BACKGROUND

Evolvement of wireless communication systems may typically have as one aim to improve throughput and capacity compared to earlier wireless communication systems.

One example of a wireless communication system currently under evolvement is UMTS rescaled LTE, which is a further evolvement of UMTS LTE (Universal Mobile Telecommunication System, Long Term Evolution). In UMTS rescaled LTE the sample rate may be increased with a factor of N and the bandwidth per subcarrier may also be increased with a factor of N. For example, N may be equal to 5.

In UMTS rescaled LTE, there will be support for low latency (LL) applications with high reliability. One example of a low latency, high reliability application may be transmissions of alarms.

Low latency may, for example, be defined as a latency lower than a normal latency of the wireless communication system. In UMTS rescaled LTE, one example of a low latency may be a time between scheduling grant to scheduled resource of 1 ms or 2 TTI (transmission time interval), and an example of a nominal latency may be 4 TTI.

High reliability may, for example, be defined as an error rate lower than a normal error rate of the wireless communication system. In UMTS rescaled LTE, one example of a high reliability may be a BLER (BLock Error Rate) of $10^{-9}$.

One approach to enable low latency applications with high reliability is to introduce a separate radio access technology (RAT) and/or use a separate frequency interval (e.g. a separate frequency bandwidth) for such applications.

Another approach to enable low latency applications with high reliability is to mix the traffic of the low latency applications with the normal (e.g. mobile broadband) traffic of the wireless communication system. This is an approach envisioned for UMTS rescaled LTE.

That the requirement regarding time between scheduling grant to scheduled resource is different for the low latency applications compared to the normal traffic may be problematic.

Therefore, there is a need for approaches that guarantee fulfillment of the latency requirement of low latency applications mixed with the normal traffic of a wireless communication system.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages.

According to a first aspect, this is achieved by a method of a network node of a wireless communication system adapted to operate in association with first and second wireless communication devices.

A wireless communication system may, for example, be a cellular communication system.

The first wireless communication device is associated with a first latency requirement and the second wireless communication device is associated with a second latency requirement, wherein a latency of the second latency requirement is lower than a latency of the first latency requirement.

The method comprises receiving (from the first wireless communication device) a first scheduling request for uplink transmission by the first wireless communication device, and transmitting (to the first wireless communication device) a first scheduling grant in response to the first scheduling request. The first scheduling grant indicates an allocated first communication resource for the uplink transmission by the first wireless communication device.

The method also comprises receiving (from the second wireless communication device and simultaneously with or after transmitting the first scheduling grant) a second scheduling request for uplink transmission by the second wireless communication device, determining whether the first communication resource and an allocated second communication resource for the uplink transmission by the second wireless communication device at least partly overlap, and transmitting (to the second wireless communication device) a second scheduling grant in response to the second scheduling request. The second scheduling grant indicates the second communication resource.

The method further comprises (if it is determined that the first and second communication resources at least partly overlap) transmitting (to the first wireless communication device) a scheduling grant annulment instruction for preventing the uplink transmission by the first wireless communication device using the first communication resource.

In some embodiments, the second scheduling grant may comprise the scheduling grant annulment instruction.

The transmission of the scheduling grant annulment instruction may be by unicast (only to the first wireless communication device), by multicast (to the first wireless communication device and to other wireless communication devices), or by broadcast (to all wireless communication devices associated with the network node). Multicast and/or broadcast transmission of the scheduling grant annulment instruction may, for example, be applicable if scheduling grant(s) indicating allocated communication resource(s) that at least partly overlap with the second communication resource have been transmitted to other wireless communication devices than the first wireless communication device.

A communication resource may, for example, be a time resource, a frequency resource, a time-frequency resource, a code resource, or similar.

The latency requirements may, for example, be defined in terms of a time between transmission of a scheduling request by a wireless communication device and the correspondingly allocated communication resource or in terms of a time between transmission of a scheduling grant by a network node of the wireless communication system and the correspondingly allocated communication resource.

In some embodiments, the first scheduling grant may comprise an (explicit or implicit) instruction for the first wireless communication device to monitor reception of the scheduling grant annulment instruction. For example, monitoring reception of the scheduling grant annulment instruction may be performed by the first wireless communication device in a time interval between reception of the first scheduling grant and the first communication resource.

According to some embodiments, the scheduling grant annulment instruction may be transmitted using a method that provides high reliability. For example, the scheduling grant annulment instruction may be transmitted using the channel for scheduling grant (e.g. PDCCH—Physical Downlink Control CHannel, ePDCCH—evolved PDCCH) or another control channel (e.g. a channel dedicated to scheduling grant annulment instructions only). In some embodiments, the scheduling grant annulment instruction may be transmitted using physical channel bit(s) (e.g. a flag or a cell identity) such that detection of the scheduling grant annulment instruction may be achieved by matched filtering. In some embodiments, the scheduling grant annulment instruction may be transmitted as medium access control (MAC) information such that detection of the scheduling grant annulment instruction may be achieved after MAC decoding.

In some embodiments, the scheduling grant annulment instruction may be transmitted as message on a control channel.

The association of the first device with the first latency requirement may, for example, performed by the wireless communication system (e.g. in a configuration procedure, performed by the network node or another network node) or it may be implicit as a default latency requirement of the wireless communication system.

Thus, in some embodiments, the method may further comprise configuring the first wireless communication device as associated with the first latency requirement.

In some embodiments, the association of the second device with the second latency requirement is performed by the wireless communication system (e.g. in a configuration procedure, performed by the network node or another network node). In such embodiments, the network node is inherently aware of that the second scheduling request relates to uplink transmission associated with the second (low) latency requirement.

Thus, in some embodiments, the method may further comprise configuring the second wireless communication device as associated with the second latency requirement.

In some embodiments, the association of the second device with the second latency requirement is performed by the second wireless communication device. For example, the second wireless communication device may be associated with the first latency requirement and may determine to temporarily change to an association with the second latency requirement for transmission of particular data.

In such embodiments, the second scheduling request may comprise an indication that it relates to uplink transmission associated with the second (low) latency requirement.

Thus, in some embodiments, the second scheduling request may comprise an indication that the second wireless communication device is associated with the second latency requirement for the uplink transmission by the second wireless communication device.

Alternatively or additionally, the second scheduling request may be received in a communication resource for indicating that the second wireless communication device is associated with the second latency requirement for the uplink transmission by the second wireless communication device according to some embodiments.

If it is determined that the first and second communication resources at least partly overlap, the method may, according to some embodiments, further comprise transmitting (to the first wireless communication device) a third scheduling grant indicating an allocated third communication resource for the uplink transmission by the first wireless communication device. The third scheduling grant may be transmitted separately or the scheduling grant annulment instruction may comprise the third scheduling grant. The scheduling grant annulment instruction may comprise the third scheduling grant as an explicit scheduling grant or as an implicit scheduling grant. For example, a scheduling grant annulment instruction may implicitly indicate that the third communication resource is a time shifted (e.g. by a predetermined amount of time) version of the first communication resource. In some embodiments, the third scheduling grant is transmitted separately as a response to a third scheduling request received from the wireless communication device in response to transmission of the scheduling grant annulment instruction.

A second aspect is a method of a first wireless communication device adapted to operate in association with a network node of a wireless communication system.

The method comprises transmitting (to the network node) a first scheduling request for uplink transmission by the first wireless communication device, receiving (from the network node) a first scheduling grant in response to the first scheduling request—the first scheduling grant indicating an allocated first communication resource for the uplink transmission by the first wireless communication device, monitoring reception of a scheduling grant annulment instruction from the network node, wherein the scheduling grant annulment instruction is associated with the first scheduling grant, and (if the scheduling grant annulment instruction is received from the network node) preventing the uplink transmission by the first wireless communication device using the first communication resource.

In some embodiments, the method may further comprise (if the scheduling grant annulment instruction is received) receiving (from the network node) a third scheduling grant indicating an allocated third communication resource for the uplink transmission by the first wireless communication device.

In some embodiments, the second aspect may additionally have features identical with or corresponding to any of the various features as explained above for the first aspect.

A third aspect is a computer program product comprising a computer readable medium, having thereon a computer program comprising program instructions. The computer program is loadable into a data-processing unit and adapted to cause execution of the method according to any of the first and second aspects when the computer program is run by the data-processing unit.

A fourth aspect is an arrangement for a network node of a wireless communication system adapted to operate in association with first and second wireless communication devices. The first wireless communication device is associated with a first latency requirement and the second wireless communication device is associated with a second latency requirement, wherein a latency of the second latency requirement is lower than a latency of the first latency requirement.

The arrangement comprises a receiver adapted to receive a first scheduling request from the first wireless communication device for uplink transmission by the first wireless communication device, and a second scheduling request from the second wireless communication device for uplink transmission by the second wireless communication device.

The arrangement also comprises a transmitter adapted to transmit a first scheduling grant to the first wireless communication device in response to the first scheduling request (the first scheduling grant indicating an allocated first communication resource for the uplink transmission by the first wireless communication device), and a second scheduling grant to the second wireless communication device in response to the second scheduling request (the second scheduling grant indicating an allocated second communication resource for the uplink transmission by the second wireless communication device).

The arrangement also comprises a controller adapted to (if the second scheduling request is received simultaneously with or after transmission of the first scheduling grant) determine whether the first and second communication resources at least partly overlap and (if it is determined that the first and second communication resources at least partly overlap) cause the transmitter to transmit a scheduling grant annulment instruction to the first wireless communication device for preventing the uplink transmission by the first wireless communication device using the first communication resource.

In some embodiments, the controller may comprise a determiner adapted to determine whether the first and second communication resources at least partly overlap.

According to some embodiments, the arrangement may further comprise a scheduler adapted to allocate the first and second communication resources in response to reception of the first and second scheduling requests, respectively.

The scheduler may comprise the controller according to some embodiments.

In some embodiments, the fourth aspect may additionally have features identical with or corresponding to any of the various features as explained above for the first aspect.

A fifth aspect is a network node of a wireless communication system adapted to operate in association with first and second wireless communication devices. The network node comprises the arrangement according to the fourth aspect.

A sixth aspect is an arrangement for a first wireless communication device adapted to operate in association with a network node of a wireless communication system.

The arrangement comprises a transmitter adapted to transmit (to the network node) a first scheduling request for uplink transmission by the first wireless communication device, a receiver adapted to receive (from the network node) a first scheduling grant in response to the first scheduling request—the first scheduling grant indicating an allocated first communication resource for the uplink transmission by the first wireless communication device, a monitor adapted to monitor reception of a scheduling grant annulment instruction associated with the first scheduling grant from the network node, and a controller adapted to—if the scheduling grant annulment instruction is received from the network node—prevent the uplink transmission by the first wireless communication device using the first communication resource.

In some embodiments, the sixth aspect may additionally have features identical with or corresponding to any of the various features as explained above for the second aspect.

A seventh aspect is a first wireless communication device adapted to operate in association with a network node of a wireless communication system. The first wireless communication device comprises the arrangement according to the sixth aspect.

An advantage of some embodiments is that fulfillment may be guaranteed of the latency requirement of low latency applications mixed with the normal traffic of a wireless communication system.

For example, it may be possible—by application of some embodiments—to fulfill the low latency requirement of a scheduling request relating to a low latency application even if the resource(s) that need to be scheduled is already scheduled for normal traffic.

Another advantage of some embodiments is that improved capacity may be achieved. For example, no separate RAT or frequency interval need to be dedicated to low latency applications, but they can be mixed with the normal traffic of a wireless communication system.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where coexistence, in a wireless communication system, of wireless communication devices having different latency requirements is enabled by the existence of a scheduling grant annulment instruction. The scheduling grant annulment instruction may be used by a network node of the wireless communication system to annul a previously sent scheduling grant.

UMTS rescaled LTE will be used herein as an example scenario where some embodiments may be applicable. However, it should be understood that the invention is not limited to that specific scenario. Instead, embodiments may be applicable in any suitable situation in the field of wireless communication where wireless communication devices have different latency requirements.

Figure 1:
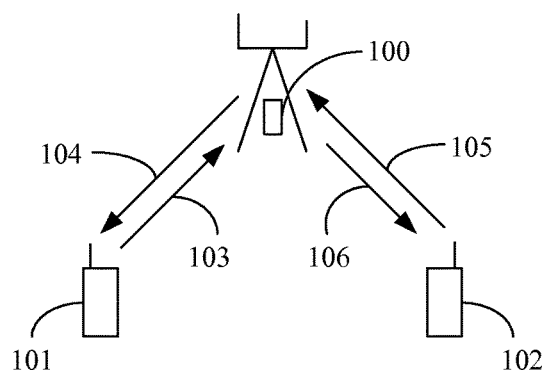
FIG. 1 is a schematic drawing illustrating an example scenario according to some embodiments.

FIG. 1 illustrates an example scenario where some embodiments may be applicable. A network node 100 of a wireless communication system operates in association with a first wireless communication device 101 via uplink transmissions 103 and downlink transmissions 104, and with a second wireless communication device 102 via uplink transmissions 105 and downlink transmissions 106.

The first wireless communication device 101 may be associated with a first latency requirement and the second wireless communication device 102 may be associated with a second latency requirement, wherein a latency of the second latency requirement is lower than a latency of the first latency requirement.

Figure 2:
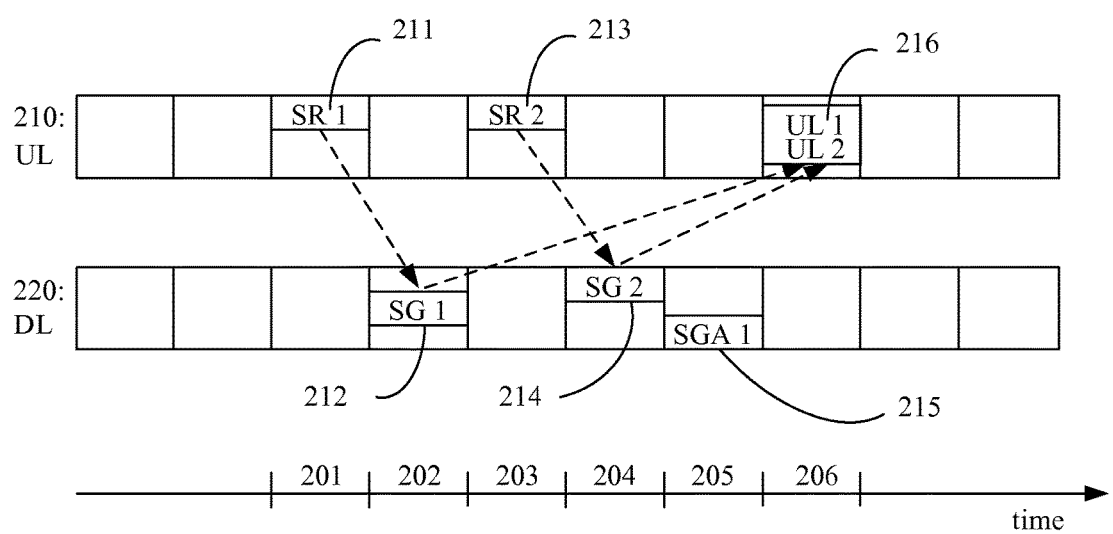
FIG. 2 is a schematic drawing illustrating an example scenario according to some embodiments.

FIG. 2 illustrates an example scenario (as experienced from the network node) according to some embodiments that may occur, for example, in the setup according to FIG. 1. In FIG. 2, 210 denotes the uplink (UL, compare with 103, 105 of FIG. 1) and 220 denotes the downlink (DL, compare with 104, 106 of FIG. 1).

In time interval 201, a first scheduling request (SR 1) 211 is received in the uplink from a first wireless communication device (compare with 101 of FIG. 1). A corresponding first scheduling grant (SG 1) 212 is transmitted in the downlink to the first wireless communication device in time interval 202. The first scheduling grant 212 indicates an allocation of a first communication resource (UL 1) 216 in time interval 206 for uplink transmission by the first wireless communication device.

In time interval 203 (after transmission of the first scheduling grant 212), a second scheduling request (SR 2) 213 is received in the uplink from a second wireless communication device (compare with 102 of FIG. 1). A corresponding second scheduling grant (SG 2) 214 is transmitted in the downlink to the second wireless communication device in time interval 204. The second scheduling grant 214 indicates an allocation of a second communication resource (UL 2) 216 in time interval 206 for uplink transmission by the second wireless communication device.

It should be noted that in some example scenarios where some embodiments may be applicable, the transmission of the first scheduling grant and the reception of the second scheduling request may be simultaneous.

In the example shown in FIG. 2, the allocation of the second communication resource (UL 2) is subject to a low latency requirement associated with the second wireless communication device. Due to this low latency requirement (and possibly also due to capacity and traffic load situations) it may be necessary to allocate a communication resource (UL 2) to the second wireless communication device that overlaps with the communication resource (UL 1) already allocated to the first wireless communication device. In FIG. 2, the overlap is exemplified as a complete overlap, but partial overlaps are also possible.

If the network node detects a (partial or full) overlap between the first and second communication resources, a scheduling grant annulment instruction (SGA 1) 215 is transmitted to the first wireless communication device in time interval 205 for preventing use of the communication resource 216 by the first wireless communication device.

It should be noted that, in some embodiments, the second scheduling grant may comprise the scheduling grant annulment instruction.

Figure 3:
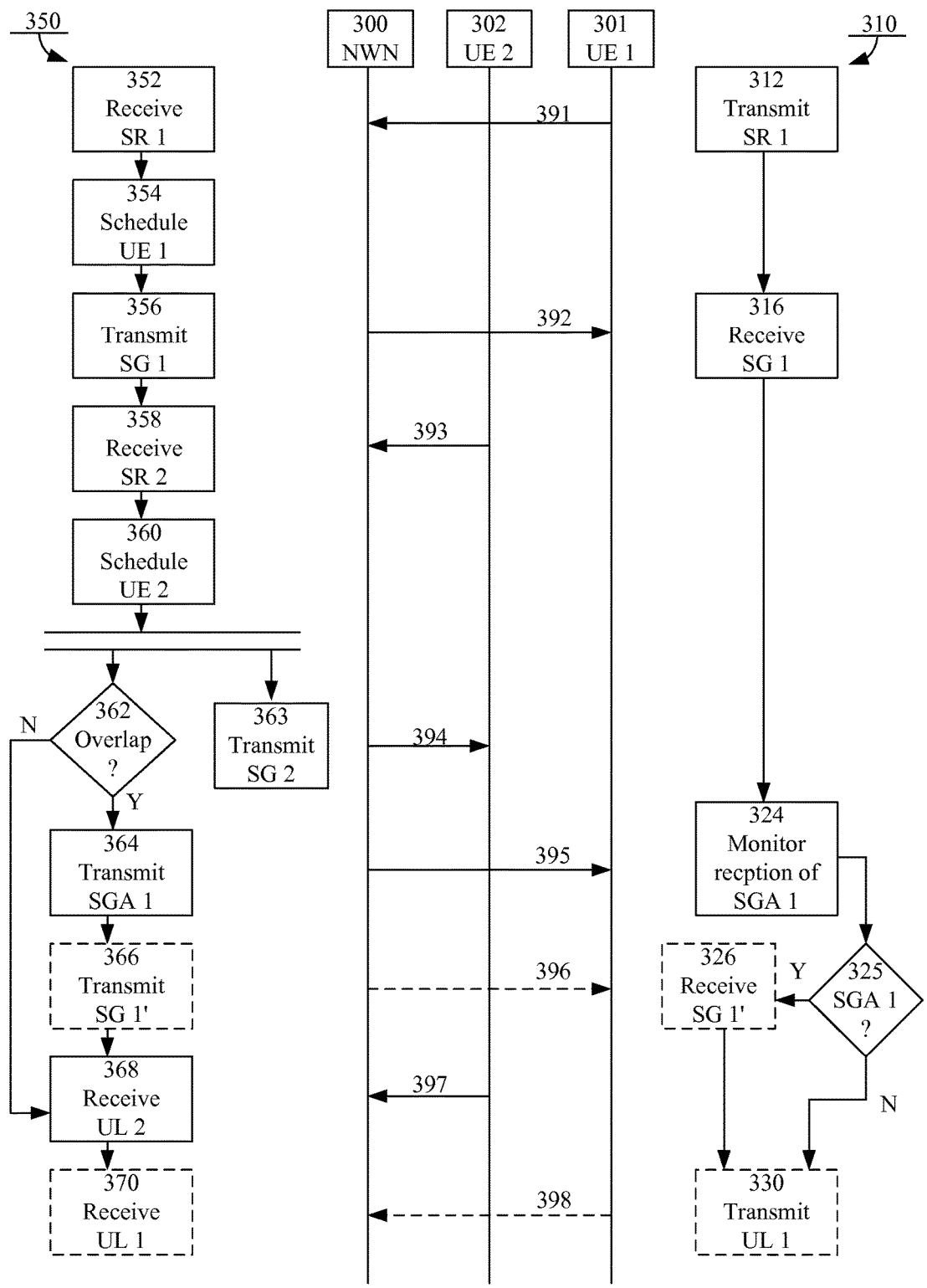
FIG. 3 is a combined flowchart and signaling diagram illustrating example method steps and signaling according to some embodiments.

FIG. 3 illustrate example methods 310, 350 and signaling according to some embodiments. The method 350 is carried out by a network node (NWN) 300 of a wireless communication system that operates in association with a first wireless communication device (UE 1) 301 and with a second wireless communication device (UE 2) 302. The first wireless communication device 301 is associated with a first latency requirement and the second wireless communication device 302 is associated with a second latency requirement, wherein a latency of the second latency requirement is lower than a latency of the first latency requirement. The method 310 is carried out by the first wireless communication device (UE 1) 301.

For example, the network node 300 may be the network node 100 of FIG. 1, the first wireless communication device 301 may be the first wireless communication device 101 of FIG. 1 and the second wireless communication device 302 may be the second wireless communication device 102 of FIG. 1. FIG. 2 may also serve as an illustration that supplements the following description of FIG. 3.

In step 312, UE 1 transmits a first scheduling request (SR 1) 391 for uplink transmission, which is received by the network node in step 352. The network node schedules UE 1 (i.e. allocates a first communication resource) for the requested uplink transmission in step 354. A first scheduling grant (SG 1) 392 indicating the allocated first communication resource is transmitted to UE 1 in step 356 and received by UE 1 in step 316. The first scheduling grant may comprise an (implicit or explicit) instruction to UE 1 to monitor reception of a scheduling grant annulment instruction.

Then, UE 2 transmits a second scheduling request (SR 2) 393 for uplink transmission, which is received by the network node in step 358. The network node is aware of the second scheduling request being related to a lower than nominal latency requirement (where the nominal latency requirement corresponds to the first latency requirement and the lower than nominal latency requirement corresponds to the second latency requirement).

For example, the network node (or another network node of the wireless communication system) may have configured UE 2 as associated with the second latency requirement. Alternatively or additionally, the second scheduling request may comprise an indication that UE 2 is associated with the second latency requirement (for the requested uplink transmission). Yet alternatively or additionally, the second scheduling request may be transmitted in a particular communication resource for indication that UE 2 is associated with the second latency requirement (for the requested uplink transmission).

The network node schedules UE 2 (i.e. allocates a second communication resource) for the requested uplink transmission in step 360. A second scheduling grant (SG 2) 394 indicating the allocated second communication resource is transmitted to UE 2 in step 363.

In parallel to (or before or after, as suitable) step 363, the network node determines, in step 362, whether the first and second communication resources overlap—at least partly.

If it is determined that the first and second communication resources do not overlap (N-path out from step 362) the network node receives respective uplink transmissions 398, 397 from UE 1 and UE 2 in steps 370 and 368, respectively.

If it is determined that the first and second communication resources do overlap (Y-path out from step 362) the network node transmits a scheduling grant annulment instruction (SGA 1) 395 to UE 1 in step 364 for preventing UE 1 from using the first communication resource. The network node may also transmit a third scheduling grant (SG 1') 395, 396 indicating a new allocated third communication resource for UE 1. The third scheduling grant may be comprised (implicitly or explicitly) in the scheduling grant annulment instruction or it may be transmitted separately as illustrated by step 366. Thereafter, the network node receives respective uplink transmissions (UL 1, UL 2) 398, 397 from UE 1 and UE 2 in steps 370 and 368, respectively.

When UE 1 has received the first scheduling grant in step 316, it monitors reception of the scheduling grant annulment instruction (SGA 1) 395 from the network node as illustrated by step 324.

If no scheduling grant annulment instruction is received (N-path out from step 325) UE 1 uses the allocated first communication resource to perform the requested uplink transmission (UL 1) 398 as illustrated by step 330.

If a scheduling grant annulment instruction is received (Y-path out from step 325) UE 1 refrains from using the allocated first communication resource. If a third scheduling grant is received (together with the scheduling grant annulment instruction in step 324 or separately as illustrated by step 326), UE 1 uses the new allocated third communication resource indicated by the third scheduling grant to perform the requested uplink transmission (UL 1) 398 as illustrated by step 330.

Figure 4:
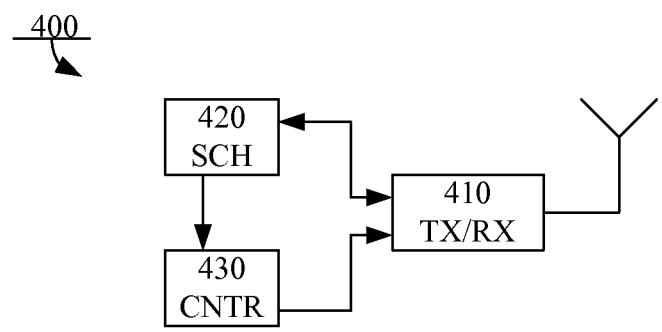
FIG. 4 is a block diagram illustrating an example arrangement according to some embodiments.

FIG. 4 illustrates an example arrangement 400 for a network node according to some embodiments. The arrangement 400 may, for example, be comprised in the network node 100 of FIG. 1. The arrangement 400 may, for example, be adapted to perform the method 350 of FIG. 3.

The arrangement comprises transceiver (TX/RX) 410—comprising a transmitter and a receiver, a controller (CNTR) 430 and a scheduler (SCH) 420.

The receiver is adapted to receive a first scheduling request from a first wireless communication device (compare with step 352 of FIG. 3) and a second scheduling request from a second wireless communication device (compare with step 358 of FIG. 3). The network node is aware of the second scheduling request being related to a lower than nominal latency requirement as has been elaborated on above.

The scheduler is adapted to allocate first and second communication resources in response to reception of the first and second scheduling requests, respectively (compare with steps 354, 360 of FIG. 3).

The transmitter is adapted to transmit a first scheduling grant indicating the allocated first communication resource to the first wireless communication device (compare with step 356 of FIG. 3) and a second scheduling grant indicating the allocated second communication resource to the second wireless communication device (compare with step 363 of FIG. 3).

The controller is adapted to (if the second scheduling request is received after transmission of the first scheduling grant) determine whether the allocated first and second communication resources at least partly overlap (compare with step 362 of FIG. 3). If it is determined that the first and second communication resources at least partly overlap, the controller is further adapted to cause the transmitter to transmit a scheduling grant annulment instruction to the first wireless communication device for preventing the uplink transmission by the first wireless communication device using the first communication resource (compare with step 364 of FIG. 3).

Figure 5:
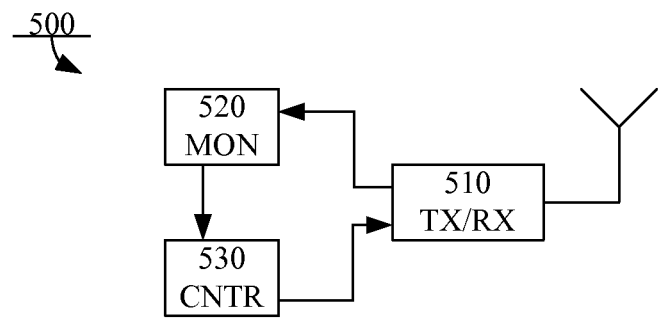
FIG. 5 is a block diagram illustrating an example arrangement according to some embodiments.

FIG. 5 illustrates an example arrangement 500 for a communication device according to some embodiments. The arrangement 500 may, for example, be comprised in the first communication device 101 of FIG. 1. The arrangement 500 may, for example, be adapted to perform the method 310 of FIG. 3.

The arrangement comprises transceiver (TX/RX) 510—comprising a transmitter and a receiver, a controller (CNTR) 530 and a monitor (MON) 520.

The transmitter is adapted to transmit a first scheduling request for uplink transmission (compare with step 312 of FIG. 3) and the receiver is adapted to receive a first scheduling grant in response to the first scheduling request (compare with step 316 of FIG. 3), the first scheduling grant indicating an allocated first communication resource for uplink transmission by the first wireless communication device.

The monitor is adapted to monitor reception of a scheduling grant annulment instruction from the network node (compare with step 324 of FIG. 3) and the controller is adapted to, if the scheduling grant annulment instruction is received, prevent the transmitter from using the first communication resource. The monitor may comprise a detector adapted to detect reception of a scheduling grant annulment instruction.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a network node) comprising circuitry/logic or performing methods according to any of the embodiments. The electronic apparatus may, for example, be a portable or handheld mobile radio communication equipment, a mobile radio terminal, a mobile telephone, a base station, a communicator, an electronic organizer, a smartphone, a computer, a notebook, or a mobile gaming device.

Figure 6:
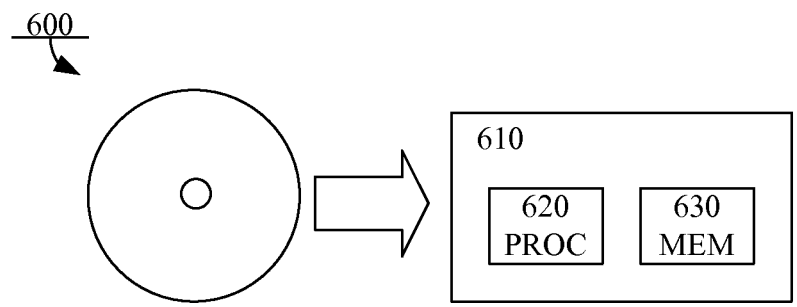
FIG. 6 is a schematic drawing illustrating an example computer readable medium according to some embodiments.

According to some embodiments, a computer program product comprises a computer readable medium such as, for example, a diskette, a USB-stick, a plug-in card, an embedded drive, or a CD-ROM as illustrated by 600 in FIG. 6. The computer readable medium may have stored thereon a computer program comprising program instructions. The computer program may be loadable into a data-processing unit (PROC) 620, which may, for example, be comprised in a network node or a wireless communication device 610. When loaded into the data-processing unit, the computer program may be stored in a memory (MEM) 630 associated with or integral to the data-processing unit. According to some embodiments, the computer program may, when loaded into and run by the data-processing unit, cause the data-processing unit to execute method steps according to, for example, any of the methods shown in FIG. 3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a network node of a wireless communication system adapted to operate in association with first and second wireless communication devices, the method comprising:

receiving, from the first wireless communication device, a first scheduling request for uplink transmission by the first wireless communication device, wherein the first wireless communication device is associated with a first latency requirement requiring a first latency;

transmitting, to the first wireless communication device, a first scheduling grant in response to the first scheduling request, the first scheduling grant indicating an allocated first communication resource for the uplink transmission by the first wireless communication device;

receiving, from the second wireless communication device and simultaneously with or after transmitting the first scheduling grant, a second scheduling request for uplink transmission by the second wireless communication device, wherein the second wireless communication device is associated with a second latency requirement requiring a second latency that is lower than the first latency;

determining whether the first communication resource and an allocated second communication resource for the uplink transmission by the second wireless communication device at least partly overlap;

transmitting, to the second wireless communication device, a second scheduling grant in response to the second scheduling request, the second scheduling grant indicating the second communication resource; and if it is determined that the first and second communication resources at least partly overlap, transmitting, to the first wireless communication device, a scheduling grant annulment instruction for preventing the uplink transmission by the first wireless communication device associated with the first latency requirement using the first communication resource.

2. The method of claim 1 further comprising, if it is determined that the first and second communication resources at least partly overlap, transmitting, to the first wireless communication device, a third scheduling grant indicating an allocated third communication resource for the uplink transmission by the first wireless communication device.

3. The method of claim 2 wherein the scheduling grant annulment instruction comprises the third scheduling grant.

4. The method of claim 2 wherein the third scheduling grant is transmitted separately from the scheduling grant annulment instruction.

5. The method of claim 1, further comprising configuring the first wireless communication device as associated with the first latency requirement and configuring the second wireless communication device as associated with the second latency requirement.

6. The method of claim 1, wherein the second scheduling request comprises an indication that the second wireless communication device is associated with the second latency requirement for the uplink transmission by the second wireless communication device.

7. The method of claim 1, wherein the second scheduling request is received in a communication resource for indicating that the second wireless communication device is associated with the second latency requirement for the uplink transmission by the second wireless communication device.

8. The method of claim 1, wherein the transmission of the scheduling grant annulment instruction is by:
unicast to the first wireless communication device;
multicast to the first wireless communication device and to one or more other wireless communication devices; or
broadcast to all wireless communication devices associated with the network node.

9. The method of claim 1, wherein the second scheduling grant comprises the scheduling grant annulment instruction.

10. A method of a first wireless communication device adapted to operate in association with a network node of a wireless communication system, the method comprising:

transmitting, to the network node, a first scheduling request for uplink transmission by the first wireless communication device, wherein the first wireless communication device is associated with a first latency requirement requiring a first latency;

receiving, from the network node, a first scheduling grant in response to the first scheduling request, the first scheduling grant indicating an allocated first communication resource for the uplink transmission by the first wireless communication device, wherein the first communication resource and a second communication resource at least partly overlap, wherein the second communication resource is for uplink transmission by a second wireless communication device adapted to operate in association with the network node, wherein the second wireless communication device is associated with a second latency requirement requiring a second latency that is lower than the first latency, and wherein a second scheduling request for the uplink transmission by the second wireless communication device is received by the network node simultaneously with or after a transmission by the network node of the first scheduling grant;

monitoring reception of a scheduling grant annulment instruction from the network node, wherein the scheduling grant annulment instruction is associated with the first scheduling grant; and if the scheduling grant annulment instruction is received from the network node, by preventing the uplink transmission by the first wireless communication device associated with the first latency requirement using the first communication resource.

11. The method of claim 10 further comprising, if the scheduling grant annulment instruction is received, receiving, from the network node, a third scheduling grant indicating an allocated third communication resource for the uplink transmission by the first wireless communication device.

12. The method of claim 11 wherein the scheduling grant annulment instruction comprises the third scheduling grant.

13. The method of claim 11 wherein the third scheduling grant is received separately from the scheduling grant annulment instruction.

14. A nontransitory computer readable medium, having thereon a computer program comprising program instructions, the computer program being loadable into a data-processing unit and adapted to cause execution of a method when the computer program is run by the data-processing unit, wherein the method is of a network node of a wireless communication system adapted to operate in association with first and second wireless communication devices, the method comprising:

receiving, from the first wireless communication device, a first scheduling request for uplink transmission by the first wireless communication device, wherein the first wireless communication device is associated with a first latency requirement requiring a first latency;

transmitting, to the first wireless communication device, a first scheduling grant in response to the first scheduling request, the first scheduling grant indicating an allocated first communication resource for the uplink transmission by the first wireless communication device;

receiving, from the second wireless communication device and simultaneously with or after transmitting the first scheduling grant, a second scheduling request for uplink transmission by the second wireless communication device, wherein the second wireless communication device is associated with a second latency requirement requiring a second latency that is lower than the first latency;

determining whether the first communication resource and an allocated second communication resource for the uplink transmission by the second wireless communication device at least partly overlap;

transmitting, to the second wireless communication device, a second scheduling grant in response to the second scheduling request, the second scheduling grant indicating the second communication resource; and if it is determined that the first and second communication resources at least partly overlap, transmitting, to the first wireless communication device, a scheduling grant annulment instruction for preventing the uplink transmission by the first wireless communication device associated with the first latency requirement using the first communication resource.

15. An arrangement for a network node of a wireless communication system adapted to operate in association with first and second wireless communication devices, the arrangement comprising:

a receiver adapted to receive:
  a first scheduling request from the first wireless communication device for uplink transmission by the first wireless communication device, wherein the first wireless communication device is associated with a first latency requirement requiring a first latency; and
  a second scheduling request from the second wireless communication device for uplink transmission by the second wireless communication device, wherein the second wireless communication device is associated with a second latency requirement requiring a second latency that is lower than the first latency;

a transmitter adapted to transmit:
  a first scheduling grant to the first wireless communication device in response to the first scheduling request, the first scheduling grant indicating an allocated first communication resource for the uplink transmission by the first wireless communication device; and
  a second scheduling grant to the second wireless communication device in response to the second scheduling request, the second scheduling grant indicating an allocated second communication resource for the uplink transmission by the second wireless communication device; and a controller adapted to, if the second scheduling request is received simultaneously with or after transmission of the first scheduling grant:
  determine whether the first and second communication resources at least partly overlap; and
  if it is determined that the first and second communication resources at least partly overlap, causing the transmitter to transmit a scheduling grant annulment instruction to the first wireless communication device for preventing the uplink transmission by the first wireless communication device associated with the first latency requirement using the first communication resource.

16. The arrangement of claim 15 further comprising a scheduler adapted to allocate the first and second communication resources in response to reception of the first and second scheduling requests, respectively.

17. A network node of a wireless communication system adapted to operate in association with first and second wireless communication devices, the network node comprising the arrangement according to claim 15.

18. An arrangement for a first wireless communication device adapted to operate in association with a network node of a wireless communication system, the arrangement comprising:

a transmitter adapted to transmit, to the network node, a first scheduling request for uplink transmission by the first wireless communication device, wherein the first wireless communication device is associated with a first latency requirement requiring a first latency;

a receiver adapted to receive, from the network node, a first scheduling grant in response to the first scheduling request, the first scheduling grant indicating an allocated first communication resource for the uplink transmission by the first wireless communication device, wherein the first communication resource and a second communication resource at least partly overlap, wherein the second communication resource is for uplink transmission by a second wireless communication device adapted to operate in association with the network node, wherein the second wireless communication device is associated with a second latency requirement requiring a second latency that is lower than the first latency, and wherein a second scheduling request for the uplink transmission by the second wireless communication device is received by the network node simultaneously with or after a transmission by the network node of the first scheduling grant;

a monitor adapted to monitor reception of a scheduling grant annulment instruction associated with the first scheduling grant from the network node; and a controller adapted to, if the scheduling grant annulment instruction is received from the network node, preventing the uplink transmission by the first wireless communication device associated with the first latency requirement using the first communication resource.

19. A first wireless communication device adapted to operate in association with a network node of a wireless communication system, the first wireless communication device comprising the arrangement according to claim 18.

* * * * *